July 26, 1932.  P. VOGLSAMER  1,868,549
METERING APPARATUS FOR MIXING MACHINES
Filed Feb. 25, 1930
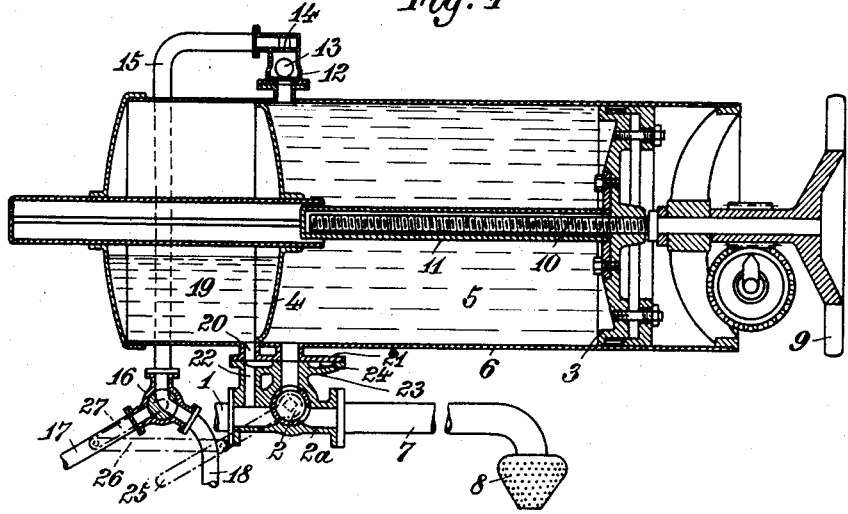
Inventor:
Peter Voglsamer Patented July 26, 1932

1,868,549

UNITED STATES PATENT OFFICE

PETER VOGLSAMER, OF MUNICH, GERMANY, ASSIGNOR TO TECHNIK UND INVESTMENT AKTIENGESELLSCHAFT OF VADUZ, LIECHTENSTEIN

METERING APPARATUS FOR MIXING MACHINES

Application filed February 25, 1930, Serial No. 431,325, and in Germany March 1, 1929.

My invention relates to apparatus for preparing mixtures of solid matter and liquid, such as concrete or mortar mixtures, to which solid matter predetermined equal liquid quantities have to be added. In apparatus of this class a closed metering vessel is inserted in the liquid feeding conduit in front of the mixer.

The contents of this metering vessel which is provided with an air removing device, can be altered by shifting one or more of its walls which to this end may be designed so as to form a piston. After having been adjusted, these walls remain in their set position during service, so that always the same liquid quantity is metered. Into the metering vessel opens a pipe including a three way cock which according to its position establishes communication between the metering vessel and the liquid supply pipe or the delivery pipe leading from the vessel to the mixer.

In order to permit of one and the same type of this metering vessel to be easily used in connection with mixers of any different description, according to my invention the three way cock together with its housing is adjustably connected to the metering vessel in such a manner that it can be turned about the axis of the connecting branch provided on the metering vessel and thus adjusted to meet the special conditions of space.

When the liquid supply is shut off suddenly, shocks may easily occur which may cause destruction. In order to avoid such shocks the metering vessel is equipped with an air chamber that is permanently in communication with the cock housing and the liquid feeding pipe. In order to maintain this connection of the air chamber with the liquid feeding pipe even when the cock housing has been turned, an annular groove is provided between the contact surfaces of the connection branch of the vessel and of the cock housing, which groove in every position of the housing relatively to the connection branch secures communication between the air chamber and the liquid feeding pipe. Therefore the water shocks cannot have any noxious effect because of the fact that the air cushion in the metering vessel takes up all water shocks.

A further advantage of my improved arrangement is the following.

In the designs hitherto known emptying of the metering chamber took place by the static pressure of the liquid column through the three way cock. Now it has been found in practice that an unfavorable effect may be obtained by the closed liquid jet striking the constituents to be mixed in so far as dry or pulverized matter such as concrete, chemical substances and the like, tends to float on the surface of the liquid, this leading to an unsatisfactory distribution of the particles or to a de-mixation of the mass to be produced. I avoid this drawback by distributing the liquid to be added in finely distributed state on the whole surface of the matter to be treated, this being performed preferably by a series of nozzles or by a distributor constructed like a rose and having a plurality of small holes. Besides avoiding the drawbacks mentioned hereinbefore, it is desirable in many industries, such as in the keramic, chemical or color industry, to finely distribute for other reasons the water or other liquid by means of spray nozzles so that it is uniformly distributed already from the first in the form of sprinkling rain. Now the existing static pressure does not suffice to reach this fine distribution of the liquid.

I therefore further improve my apparatus by applying pressure during or before emptying the metering vessel so that the delivery of the metered liquid is accelerated. To this end I prefer to supply compressed air or any other suitable gas to the metering vessel. This pressure means is fed simplest by means of the air removing valve of the metering vessel and more particularly by providing in the air removing pipe a three way cock which during the delivery period connects the metering vessel to the compressed air feeding pipe and during the re-filling period to the outer air. In order to perform this reversal of the three way air cock synchronously with the reversal of the water-feeding three way cock, I positively couple these two cocks by interconnecting them by a suitable rigging or mounting them on a common axle.

In order to obtain continuous operation, I use two equal metering vessels interconnected in such a manner that while the one is filled the other is emptied and vice-versa. I attain this alternative operation by positively coupling the two water-supplying three way cocks. I further interconnect the two vessels on their top by a pipe, so that the air of the vessel just being filled may escape under the action of the pressure of the liquid fed, into the other vessel that is then emptied, this air thus acting as compressed air.

In the accompanying drawing is illustrated my improved metering vessel, Figure 1 being a longitudinal section therethrough, while Figure 2 shows the arrangement of two interconnected twin vessels adapted to obtain the above alternative action.

1 denotes the water supply pipe that opens into the housing 2a of a three way cock 2. The water fed flows through the passages of this cock to the metering chamber 5 of the vessel 6 which chamber is confined laterally by the fixed front wall 4 and a piston wall 3. In the position illustrated in Figure 1, of the cock 2 the water flows through the drain pipe 7 to the distributor, by means of rose 8 and arrives thus at the material to be moistened. The piston wall 3 can be shifted toward the metering chamber 5 by means of a spindle 10 that has mounted on it a hand wheel 9. The threaded portion of spindle 10 is lodged in a jacket 11 guided on the fixed wall 4 and fixed on the piston wall 3, and is thus protected from the access of the liquid in chamber 5. The vessel 6 has on its top an air removing valve 12 which admits free passage of the air in both directions but the hollow ball of which is lifted and urged onto the upper seat 14 when water rises from the chamber 5 up to valve 12. To the latter is connected the exhaust pipe 15 which at the same time forms the supply pipe for compressed air. A three way cock 16 is provided in pipe 15 which by a pipe 18 is connected to a source of compressed air and by a pipe 17 with the outer air.

The one end of the vessel 6 is constructed so as to form an air chamber 19 which by a bore 20 of a connection branch or flange 21 and a corresponding bore 22 of the housing 2a of cock 2 permanently communicates with the water feeding pipe 1. I provide an annular groove 24 in the surface of the flange 23 of housing 2a which flange abuts on flange 21 of the connection branch of vessel 6, which groove is in communication with the bore 20. I attain in this manner permanent communication between the bores 20 and 22 whatever the position of the cock housing may be, so that the air chamber 19 is permanently in communication with the water feeding pipe 1.

The two three way cocks 2 and 16 are coupled with one another by a system of levers 25, 26, 27 in such a way that they operate in synchronism.

Figure 2 illustrates a metering appliance having twin vessels 6, 6.

Here the water supply pipe 1 is branched so as to form two pipes 28, 29 including two three way cocks 31 and 32 rigidly interconnected by a common actuating lever 30, the bores of these cocks being displaced to one another in such a manner that during filling of the one vessel 6 the other is drained. The drain pipe is not illustrated in Figure 2 for sake of clearness, but only a connection branch 32a on the three way cock 32. The air valves 33 and 34 which are of the same construction as valve 12, Figure 1, are interconnected by a pipe 35, so that the above-described exchange of air can be performed.

In the apparatus as shown in Fig. 1 it is clear that the water supply is constantly in communication with the air chamber 19 of vessel 6. For this purpose, a passage 22 is provided in the housing 2a of the valve, which housing cooperates with a flange 21 mounted on the vessel 6. This flange 21 has an opening 20 therein communicating with the air chamber 19. It is obvious that the valve housing 2a may be rotated on the flange 21 by suitably applying clamps which contact with the flanges 21 and 23, and by loosening the bolts on the clamps the valve housing can be rotated; but, due to the groove 24, the water supply from the pipe 1 will always be in communication with the air chamber by means of openings 20 and 22. Similar clamps can be applied on the valve 16 on its connecting flange with the pipe 15, so that the valve can also be rotated, which is preferably carried out in order to adjust the exhaust pipe 7 to any desired angle. To accommodate the movement of the valves, the supply pipe 1, as well as the pipes 17 and 18, may be made of flexible material; and to prevent leakage between the flanges, suitable washers may be inserted.

What I claim and desire to secure by Letters Patent, is:—

1. A metering apparatus for mixing machines, comprising a vessel having a metering chamber and an air chamber; and a valve housing and valve in communication with a liquid supply and to both chambers, the communication of the liquid supply through the valve housing in the air chamber being continuously open irrespective of the position of the valve.

2. A metering apparatus for mixing machines, comprising a vessel having a metering chamber and an air chamber; and a valve in communication with a liquid supply and to both chambers, the communication of the liquid supply to the air chamber being continuously open irrespective of the position of the valve.

3. A metering apparatus for mixing machines, comprising a vessel having a metering chamber and an air chamber; a flange on the vessel having communication opening to both chambers; and a valve housing and valve cooperating with said flange in communication with a liquid supply and with both openings in the flange, the communication of the liquid supply through the valve housing and the flange being continuously open irrespective of the position of the valve.

4. A metering apparatus for mixing machines, comprising a vessel having a metering chamber and an air chamber; a valve housing and valve in communication with a liquid supply and to both chambers, the communication of the liquid supply through the valve housing to the air chamber being continuously open irrespective of the position of the valve; a second valve in communication with a compressed air supply and with the metering chamber; and means for simultaneously operating both valves.

5. A metering apparatus for mixing machines, comprising a vessel having a metering chamber and an air chamber; a flange on the vessel having communication opening to both chambers; a valve housing and valve cooperating with said flange in communication with a liquid supply and with both openings in the flange, the communication of the liquid supply through the valve housing and the flange being continuously open irrespective of the position of the valve; a second valve in communication with a compressed air supply and with the metering chamber; and means for simultaneously operating both valves so that when the first-named valve is in the liquid filling position into the metering chamber the second-named valve will exhaust the air from the metering chamber and when the valves are reversed the first-named valve will exhaust the liquid from the metering chamber and the second-named valve will permit compressed air to enter the metering chamber.

In testimony whereof I affix my signature.
    PETER VOGLSAMER.